United States Patent [19]

Hudson

[11] Patent Number: 5,206,732
[45] Date of Patent: Apr. 27, 1993

[54] VIDEO CAMERA CONTROL APPARATUS

[75] Inventor: John Hudson, Aldershot, England

[73] Assignee: Sony Broadcast & Communications Limited, Basingstoke, United Kingdom

[21] Appl. No.: 804,917

[22] Filed: Dec. 11, 1991

[30] Foreign Application Priority Data

Jan. 10, 1991 [GB] United Kingdom ................. 9100507

[51] Int. Cl.$^5$ .......................... H04N 5/30; H04N 7/18
[52] U.S. Cl. .................................. 358/209; 358/210; 358/108
[58] Field of Search .................. 358/108, 210, 86, 903, 358/909, 209, 181, 185

[56] References Cited

U.S. PATENT DOCUMENTS

| | | | |
|---|---|---|---|
| 4,321,625 | 3/1982 | Smith | 358/210 |
| 4,777,526 | 10/1988 | Saitoh et al. | 358/108 |
| 4,985,783 | 1/1991 | Falck | 358/210 |
| 5,109,278 | 3/1992 | Erickson et al. | 358/108 |

FOREIGN PATENT DOCUMENTS 58-172071 10/1983 Japan ..................... 358/210

Primary Examiner—Michael T. Razavi
Assistant Examiner—Wendy R. Greening
Attorney, Agent, or Firm—William S. Frommer; Alvin Sinderbrand

[57] ABSTRACT

A video camera control apparatus (10') includes a respective remote control panel (14) and a respective camera control unit (16) for each of several video cameras (12) to be controlled by the apparatus. Each remote control panel (14) is connected to the associated camera control unit (16) by a respective bus (18) whereby technical operational control of each camera can be effected at the associated remote control panel (14). A respective interface unit (30) is connected in the bus (18) between each remote control panel (14) and the associated camera control unit (16). A master control unit (34) connected to all of the interface units (30) is capable of communicating with any selected one of the camera control units (16) via the associated interface unit (30) to enable technical operational control of any selected one of the cameras (12) to be effected at the master control unit.

4 Claims, 3 Drawing Sheets

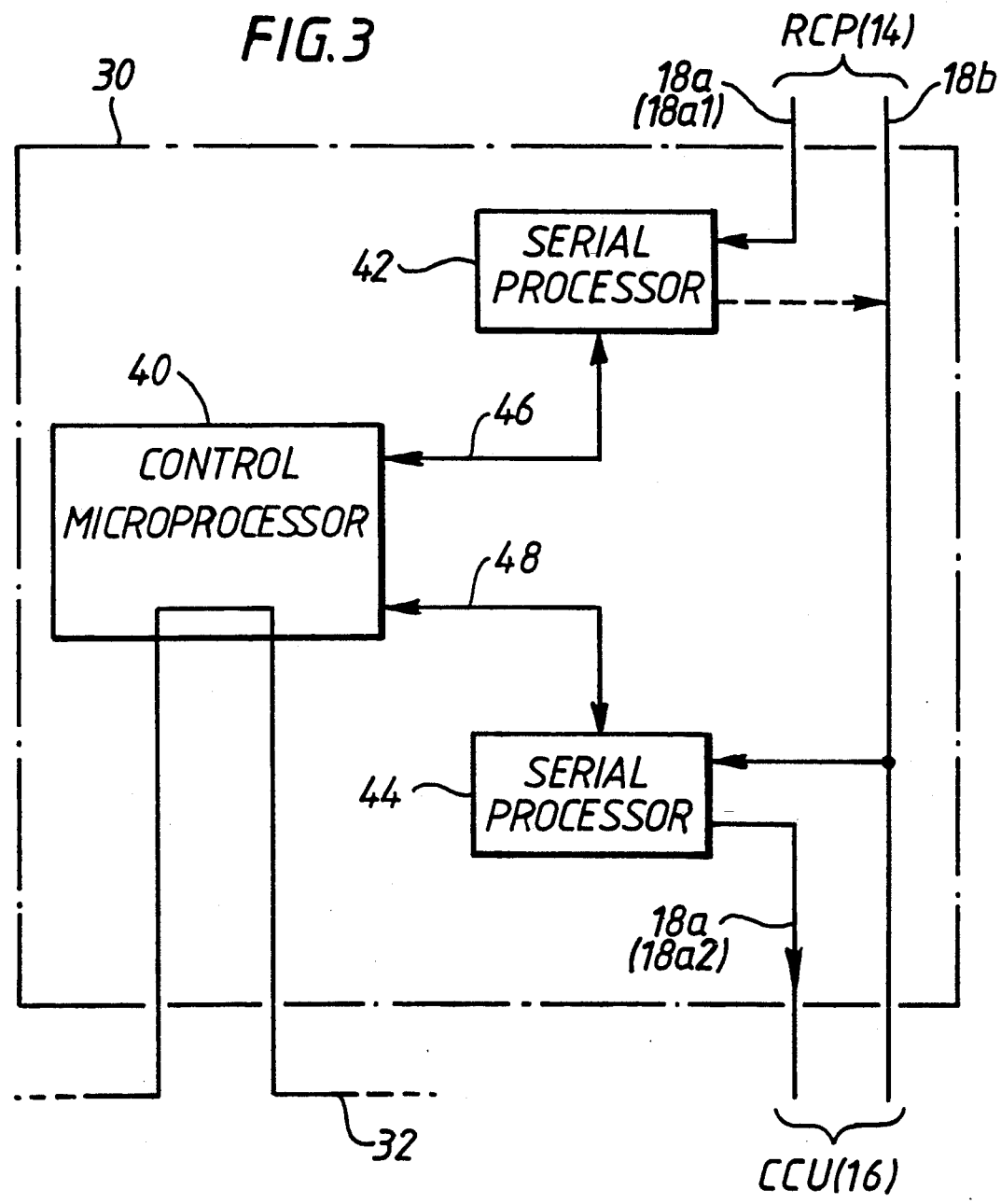

VIDEO CAMERA CONTROL APPARATUS

BACKGROUND OF THE INVENTION

1. Field of the Invention

This invention relates to video camera control apparatus. More particularly, the invention is concerned with apparatus for effecting technical operational control of each of a plurality of video cameras.

The expression "technical operational control", as used herein, refers to control of technical operating parameters (for example iris setting, black level, gamma and so forth) of a video camera that affect the video signal produced by the camera and that conventionally may require adjustment during operation of the camera.

2. Description of the Prior Art

FIG. 1 of the accompanying drawings shows a previously proposed video camera control apparatus 10. The illustrated apparatus 10 is intended for use in a television outside broadcast van or other vehicle, though it can also be used in a television studio. The apparatus 10 is used to control a plurality of video cameras; in the illustrated case it is shown as being connected, for example, to four cameras (camera heads or head units) 12, which may for example be Sony Corporation Type BVP 370 camera head units. Each camera 12 is subjected to control (technical operational control) by a respective remote control panel (RCP) 14, for example a Sony Corporation Type RCP 3720 remote control panel, via a respective camera control unit (CCU) 16, for example a Sony Corporation Type CCU 350 camera control unit.

Each remote control panel 14 is connected to the associated camera control unit 16 by a respective bidirectional 2400 bits/s serial data bus 18, which usually will be implemented as wiring. Each camera control unit 16 is connected to the associated camera 12 by a respective bidirectional 2400 bits/s serial data bus 20 which, depending upon equipment availability and the distance of the camera from the outside broadcast vehicle, may be implemented either as a radio link or a cable.

In use, each remote control panel 14 is controlled by an operator. One operator may control one remote control panel 14 or a group of them. For simplicity of explanation, however, it will be assumed in the remainder of this description that a respective operator controls each remote control panel 14. Each operator monitors the picture produced by the camera 12 associated with his remote control panel 14 and uses his remote control panel to adjust various different technical operational parameters of the camera, from time to time as is necessary, to ensure that the picture quality is optimum. Such control is effected, via the associated camera control unit 16, in a manner well known in the art. Thus, various different items of technical operational control data are sent to the camera 12 via the bus 20. The camera 12 responds to the control data and sends back to the remote control panel 14, via the bus 20, the camera control unit 16 and the bus 18, data (hereinafter referred to as "performance data") indicating the response of the camera to the control data. Each remote control panel 14 is provided with means for monitoring/displaying the performance data whereby the operator can monitor (as well as control) the operation of his camera by observing his remote control panel.

Optionally, the apparatus 10 may include a master setup unit (MSU) 22, for example a Sony Corporation Type MSU 350 master setup unit, which is connected to all of the camera control units 16 by a 2400 bits/s serial data bus 24. The primary purpose of the master setup unit 22 is to provide technical setup control, as opposed to technical operational control. Thus, for example, the master setup unit 22 is used at the start of a day's operations to balance all of the cameras 12 so that they produce similar outputs. Thereafter, in normal circumstances, the master setup unit 22 is not used during operation.

A problem arises in the case of the apparatus 10 of FIG. 1 if it is desired that a supervisory operator, who has overall responsibility for the technical quality of pictures from the various cameras (and, possibly, from other video signal sources) that are assembled together by the producer in the course of making a program, should have the facility of readily over-riding a decision on picture quality made by any individual operator by being able himself to effect technical operational control of any of the cameras. The same problem arises if a single operator is to be responsible for effecting technical operational control of all of the cameras; that is, if there is only a single operator as opposed to several individual operators supervised by a supervising operator. The supervisory operator or single operator could in theory be provided with the above facility, to some extent, by relatively minor modification of the apparatus 10 of FIG. 1, in that the master setup unit 22 (if provided) may include at least some of the control features of the individual remote control panels 14. However, problems arise if an attempt is made to implement the apparatus 10 as described above in such a manner as to achieve the end that the master setup unit 22 can either be used by a supervisory operator readily to override a decision on picture quality made by any operator by being able himself to effect technical operational control of any of the cameras 12, or used by a single operator to effect technical operational control of all of the cameras. Thus, the master setup unit 22 is physically quite large and has many control features that are redundant as regards achieving the above end. Thus, considerations of equipment layout (siting of the master setup unit 22 for convenient operation by the supervisory operator or single operator) and ergonomics of ready use of the master setup unit (quick selection of the relevant controls from among the many controls redundant for the present purpose) mean that the master setup unit 22 is in fact ill-suited for use in achieving the above end.

A subsidiary problem resulting in the master setup unit 22 not being well suited to achieving the above end is as follows. Usually, the supervisory operator or single operator will be examining on a preview monitor that one of the various camera pictures that has been selected, by means of a preview panel (a set of switches) associated with or forming part of a vision switcher (mixer), as being the next (after that currently being outputted to air or to tape) to be outputted. Therefore, if the supervisory operator (or single operator) is to be able to do this, and if he decides that he should change a technical operational control parameter of the camera providing the preview picture, he has to accept the inconvenience and delay (and the possibility of making an error) involved in having to select on the master setup unit 22 (when very little time may be available) the camera providing the preview picture.

OBJECTS AND SUMMARY OF THE INVENTION

An object of the invention is to enable selective master technical operational control of plural cameras other than by way of a master setup unit (if provided).

Another object of the invention is to enable selective master technical operational control of plural cameras by way of equipment that is ergonomically suited to this task in that it does not comprise controls redundant for that purpose.

A further object of the invention is to enable selective master technical operational control of plural cameras by way of equipment that readily may be installed at a desired site with respect to other items making up a video camera control apparatus.

The invention provides a video camera control apparatus having a respective remote control panel and a respective camera control unit for each of a number of video cameras to be controlled by the apparatus, each remote control panel being connected to the associated camera control unit by a respective bus whereby technical operational control of each camera can be effected at the associated remote control panel. A respective interface unit is connected in the bus between each remote control panel and the associated camera control unit, and a master control unit is connected to all of the interface units and is capable of communicating with any selected one of the camera control units via the associated interface unit to enable technical operational control of any selected one of the cameras to be effected at the master control unit.

In such an apparatus, the master control unit need incorporate only the control features necessary to provide master control to the supervisory operator or single operator. It need not incorporate controls used only for setting up the entire apparatus. Consequently, the master control unit need not be physically large so that it is easy to locate it so that it is convenient for the supervisory operator or single operator to operate it. Also, the supervisory operator or single operator can operate it quickly and with ease since it need not incorporate a multiplicity of redundant control features. Further, by virtue of the interface units being connected in the busses between the remote control panels and the camera control units to enable the master control unit to have access to all of the camera control units, no modifications to the remote control panels and the camera control units are necessary: the apparatus can be assembled using standard remote control panels and standard camera control units.

In a preferred embodiment of the invention disclosed hereinbelow, the master control unit is connected to all of the interface units by a common bus. Further, in the preferred embodiment, each interface unit includes a control microprocessor responsive to receipt from the master control unit on said common bus of technical operational control data identified as pertaining to the camera associated with that interface unit to direct that data to the associated camera control unit via the bus in which the interface unit is connected.

If desired, the apparatus can be so designed that, when the master control unit has established communication with a camera control unit, the master control unit then has exclusive control of that camera control unit. That is, the associated remote control unit thereupon loses control of the associated camera. In some cases, however, this might be undesirable. For example, a supervisory operator may wish to make an adjustment to correct a problem to which an individual operator has been slow to respond and may thereafter wish to leave it to the individual operator to take care of the matter. Preferably, therefore, the apparatus is so designed that control of at least some technical operating parameters of any of the cameras with whose associated camera control unit communication has been established by the master control unit can be effected at the associated remote control panel as well as at the master control unit.

Preferably, the apparatus includes a preview selector for generating a preview select signal for causing a video signal from any one of the cameras to be selected for previewing, and the master control unit is responsive to the preview select signal automatically to establish communication with the camera control unit associated with the camera whose video signal is selected for previewing. This overcomes the subsidiary problem mentioned above in that, absent any control action by the supervisory operator or single operator to the contrary, the master control unit will be ready to control the camera providing the preview picture: a separate control action to gain control access to that camera is not necessary.

Preferably, each of the remote control panels is capable of monitoring performance data supplied by the associated camera, and each interface unit is operative to pass on performance data received from the associated camera to the associated remote control panel whether or not the master control unit is in communication with the associated camera. In this way, even if a supervisory operator uses the master control unit to seize control of an individual camera, the results of any control action made by the supervisory operator are still passed on to the associated remote control panel so that the associated individual operator can continue to monitor the operation of the camera.

BRIEF DESCRIPTION OF THE DRAWINGS

The above and other objects, features and advantages of this invention will be apparent from the following detailed description of illustrative embodiments thereof, which is to be read in conjunction with the accompanying drawings, in which like references indicate like items throughout, and in which:

FIG. 3 shows how each of a plurality of interface units of the apparatus of FIG. 2 may be constructed.

DESCRIPTION OF THE PREFERRED EMBODIMENTS

Figure 1:
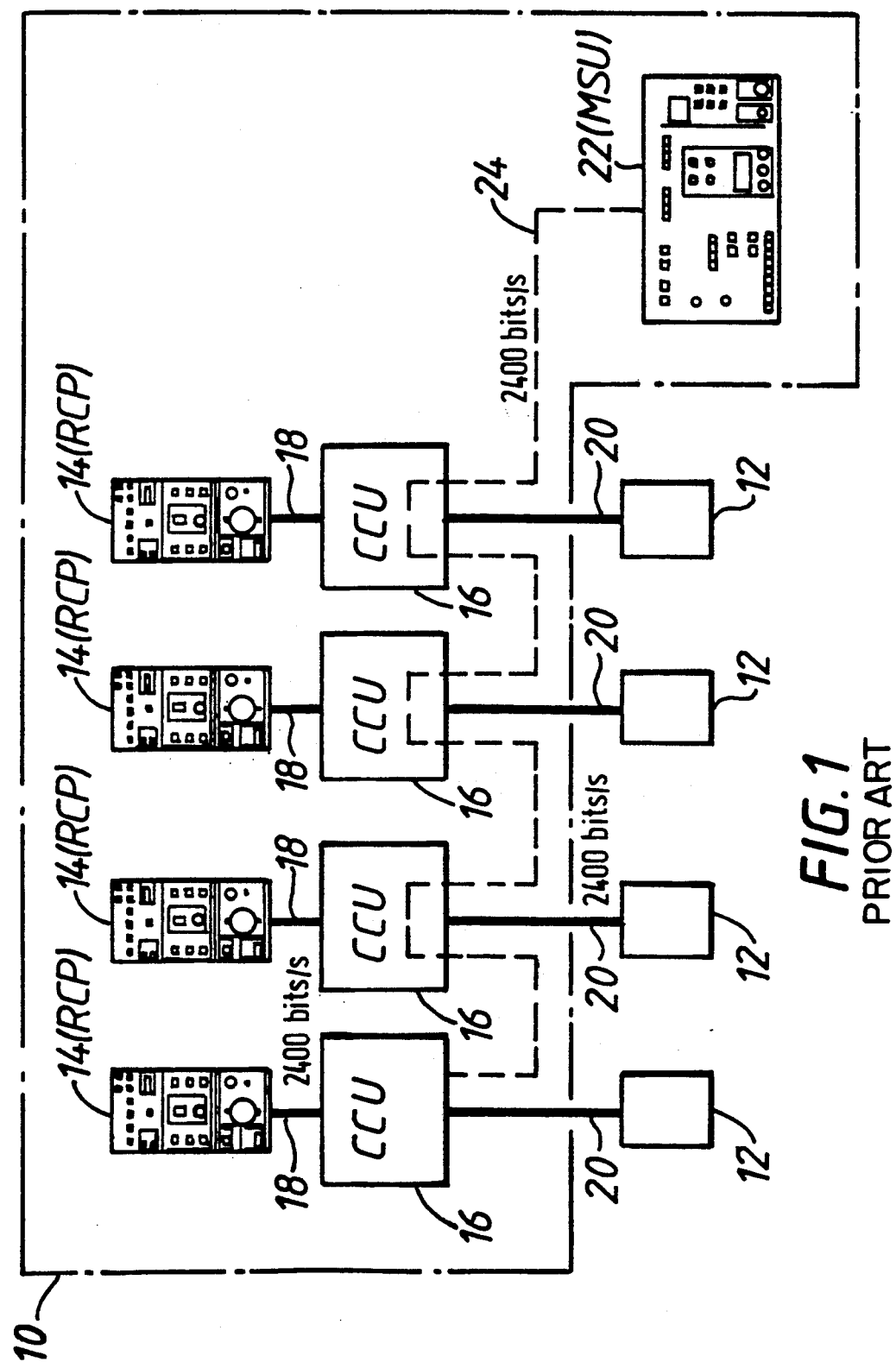
FIG. 1 shows a previously proposed video camera control apparatus.
Figure 2:
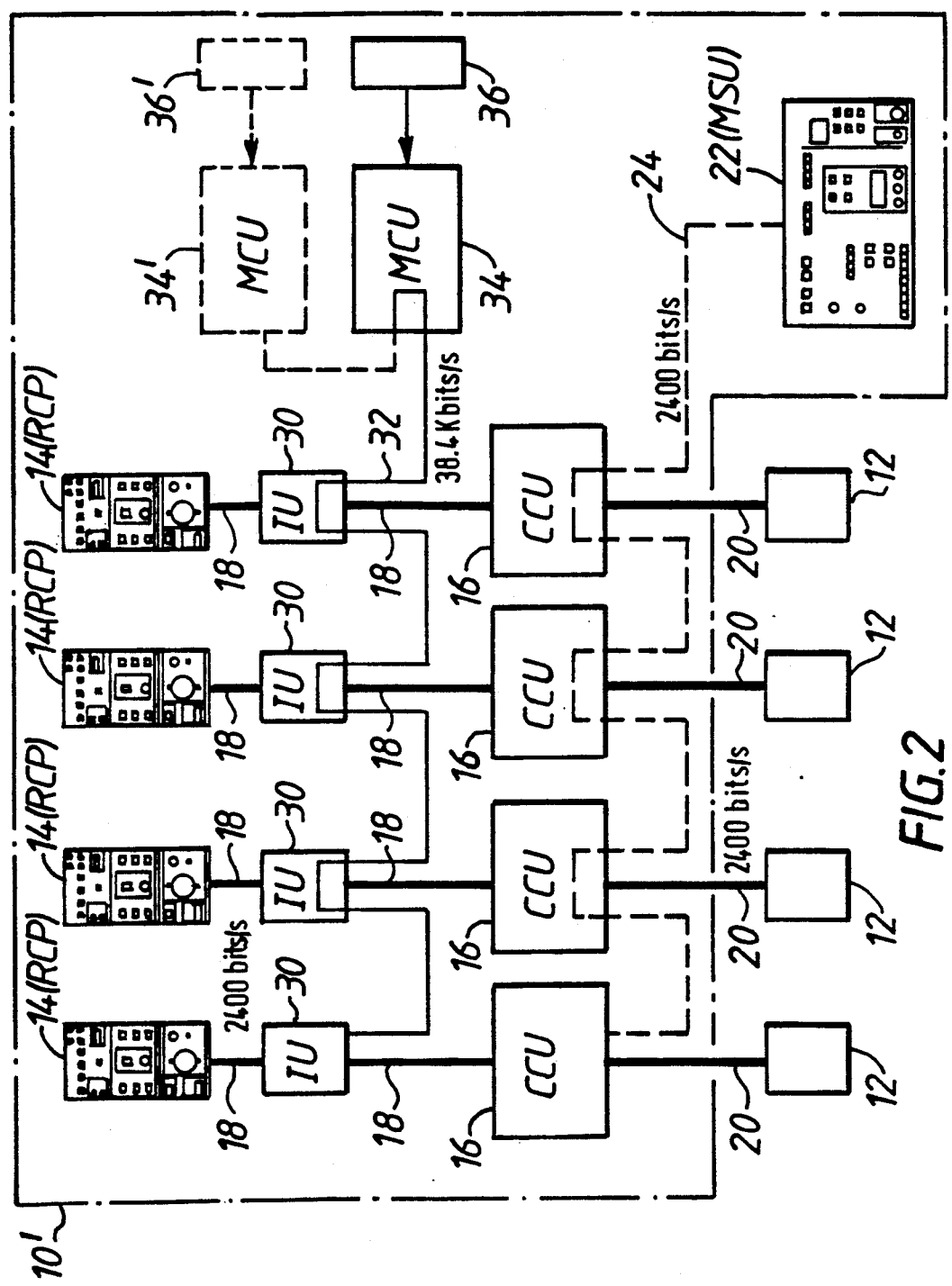
FIG. 2 shows a video camera control apparatus embodying the invention.

A video camera control apparatus 110' embodying the invention will now be described with reference to FIG. 2. The apparatus 10' of FIG. 2 is in the form of a modification of the apparatus 10 of FIG. 1 and will therefore be described only in so far as it differs from the apparatus of FIG. 1. Like the apparatus 10 of FIG. 1, while the apparatus 10' of FIG. 2 is intended for use in a television outside broadcast van or other vehicle, it could instead be used in a studio. Also like the apparatus 10 of FIG. 1, the apparatus 10' of FIG. 2 optionally includes the master setup unit 22.

In the apparatus 10' of FIG. 2, a respective interface unit (IU) 30 is connected in each of the busses 18 extending between the remote control panels 14 and the camera control units 16. The interface units 30 are all connected, by way of a common bidirectional 38.4 Kbits/s serial data bus 32, to a master control unit (MCU) 34 which is situated for use by a supervisory operator or a single operator for the purpose described above. A preview select panel 36, which may, in known manner, be associated with or incorporated in a vision switcher (not shown), is connected to the master control unit 34 to supply thereto a preview select signal which is used also to switch a preview monitor (not shown) so that the preview monitor displays that one of the pictures provided by the cameras 12 that has been selected as being the next (after that currently being outputted to air or to tape) to be outputted.

The master control unit 34 is provided with essentially the same control and monitoring features as the remote control panels 14: it does not incorporate control and monitoring features needed only for setting up the entire apparatus. The master control unit 34 outputs the technical operational control data that it produces to the bus 32. Additionally, the master control unit 34 includes, with the technical operational control data that it outputs, data that identifies which of the interface units 30 for which the technical operational control data is intended. Each of the interface units 30 is operative to ignore data identified as being intended for any of the other interface units, but to switch data intended for itself to the associated bus 18 so that it is passed on to the associated CCU 16 to control the associated camera 12. The master control unit 34 generates the above-mentioned identifying data, in response to the preview select signal supplied by the preview select panel 36, such that the data uniquely identifies the interface unit 30 (and thus the associated camera 12) in accordance with the camera identified by the preview signal. That is, the master control unit 34 is responsive to the preview select signal automatically to establish communication with the camera control unit 16 associated with the camera 12 whose video signal is selected for previewing. The supervisory operator can thus intervene in the control of any of the cameras 12 (or a single operator can control any of the cameras 12) by selecting a camera by operating the preview select panel 36 to select that camera. If desired, the master control unit 34 may be provided with other selection means enabling the supervisory operator or single operator to select a camera 12 for control otherwise than by selecting its picture as the preview picture.

If desired, the apparatus 10' can be so designed that, when the master control unit 34 has established communication with a selected camera control unit 16, the master control unit then has exclusive control of that camera control unit. That is, the associated remote control unit 14 thereupon loses control of the associated camera. This can be accomplished by designing the interface units 30 so that, when they receive technical operational control data from the master control unit 34, they thereafter do not pass on technical operational control data received from the associated remote control panel 14 until the master control unit relinquishes control. In some cases, however, this might be undesirable. For example, a supervisory operator may wish to make an adjustment to correct a defect to which the relevant individual operator has been slow to respond and may thereafter wish to leave it to the individual operator to take care of the matter. Preferably, therefore, the apparatus is so designed, for example by suitable design of the interface units 30, that control of at least some technical operating parameters of any of the cameras 12 with whose associated camera control unit 16 communication has been established by the master control unit 34 can be effected at the associated remote control panel 14 as well as at the master control unit.

As shown by dotted line in FIG. 2, the apparatus 10' may comprise at least one additional master control unit 34'. In that case, all of the master control units 34 and 34' can be connected to the same common bus 32. Also, the or each additional master control unit 34' may, as shown by dotted lines in FIG. 2, be provided with its own preview select panel 36'.

FIG. 3 shows one possible form of implementation of each of the interface units 30. The interface unit 30 comprises a control microprocessor 40, which is connected to the bus 32, together with two serial processors 42 and 44, each of which is constituted by a microprocessor. The serial processors 42 and 44 are connected to the control microprocessor 40 by buses 46 and 48, respectively.

FIG. 3 shows the bus 18 in its two separate parts, namely a part 18a that sends technical operational control data from the remote control panel 14 to the camera control unit 16 and a part 18b that sends performance data from the camera control unit 16 to the remote control panel 14. The bus part 18a is interrupted. A portion 18a1 thereof leading from the remote control panel 14 is connected to the serial processor 42 and a portion 18a2 thereof connected to the camera control unit 16 is connected to the serial processor 44. The bus part 18b is not interrupted, but is connected to the serial processor 44.

The interface unit 30 of FIG. 3 functions as follows. he control microprocessor 40 monitors the bus 32 and looks for technical operational control data from the master control unit 34. If it detects technical operational control data from the master control unit 34 that is identified as being intended for the interface unit 30 of which it forms part, the control microprocessor 40 passes the data to the serial processor 44 for transmission to the camera control unit 16.

When technical operational control data from the remote control panel 14 on the bus portion 18a1 is received by the serial processor 42, it is passed to the control microprocessor 40 via the bus 46. The control microprocessor 40 decides whether or not to send that data on, via the serial processor 44, the bus 48 and the bus portion 18a2, to the associated camera control unit 16, in accordance with whether (if the master control unit 34 has asserted control of the associated camera control unit 16) it is permissible for both the remote control panel 14 and the master control unit 34, or only the master control unit 34, to have control of the relevant parameter.

Performance data received from the camera 12 via the camera control unit 16 always goes directly, via the bus part 18b, to the remote control panel 14. The performance data also goes, via the serial processor 44 and the bus 48, to the control microprocessor 40. If the master control unit 34 has control, the control microprocessor 40 passes the performance data on the master control unit via the bus 32.

In summary, the interface unit 30 selectively sends technical operational control data from either the remote control panel 14 or the master control unit 34 to the camera 12, via the camera control unit 16, and always sends performance data returned from the camera 12 to the remote control panel 14 and selectively sends that performance data to the master control unit 34.

The reason why the form of implementation of the interface unit 30 as shown in FIG. 3 is quite complex, involving the use of three microprocessors, is simply because the 2400 bits/s serial data streams transmitted via the respective busses 18 are continuous. That is, the streams do not start or stop; they have no breaks. Consequently, the streams have to be handled with a fair degree of intelligence. In principle, if a relatively simple (intermittent) form of communication were instead used, the serial processors 42 and 44 could probably be replaced by switches.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus for controlling a plurality of video cameras, said apparatus comprising:
    a camera control unit for each of said plurality of video cameras;
    a plurality of remote control panels each connected to an associated one of the camera control units by a respective bus so that technical operational control of each of said video cameras can be effected at the associated remote control panel;
    a plurality of interface units each connected in the respective bus between one of the remote control panels and the associated camera control unit, each of said interface units including control microprocessor means which, in response to receipt of technical operational control data identified as pertaining to the camera associated with the respective interface unit, directs said data to the associated camera control unit by way of the bus to which the respective interface unit is connected; and
    a master control unit connected to all of said interface units by a common bus for supplying said technical operational control data thereto, thereby enabling said master control unit to communicate with any one of the camera control units by way of the associated interface unit and thereby allowing technical operational control of any selected one of the cameras at said master control unit.

2. An apparatus for controlling a plurality of video cameras, said apparatus comprising:
    a camera control unit for each of said plurality of video cameras;
    a plurality of remote control panels each connected to an associated one of the camera control units by a respective bus so that technical operational control of each of said video cameras can be effected at the associated remote control panel;
    a plurality of interface units each connected in the respective bus between one of the remote control panels and the associated camera control unit; and
    a master control unit connected to all of said interface units and capable of communicating with any one of the camera control units by way of the associated interface unit to enable technical operational control of any selected one of the cameras at said master control unit and control of at least some technical operating parameters of the selected one of the cameras at one of said master control unit and the respective remote control panel.

3. An apparatus for controlling a plurality of video cameras, said apparatus comprising:
    a camera control unit for each of said plurality of video cameras;
    a plurality of remote control panels each connected to an associated one of the camera control units by a respective bus so that technical operational control of each of said video cameras can be effected at the associated remote control panel;
    a plurality of interface units each connected in the respective bus between one of the remote control panels and the associated camera control unit;
    a preview selector for generating a preview select signal; and
    a master control unit connected to all of said interface units and responsive to said preview select signal for automatically establishing communication with the camera control unit associated with the camera whose video signal is selected for previewing by way of the associated interface unit to enable technical operational control of the respective camera at said master control unit.

4. An apparatus for controlling a plurality of video cameras, said apparatus comprising:
    a camera control unit for each of said plurality of video cameras;
    a plurality of remote control panels each connected to an associated one of the camera control units by a respective bus so that technical operational control of each of said video cameras can be effected at the respective remote control panel and in which each of said remote control panels is capable of monitoring performance data supplied by the respective camera;
    a plurality of interface units each connected in the respective bus between one of the remote control panels and the associated camera control unit; and
    a master control unit connected to all of said interface units and capable of communicating with any one of the camera control units by way of the associated interface unit to enable technical operational control of any selected one of the cameras at said master control unit; each of said interface units being operative to pass said performance data received from the respective camera to the respective remote control panel regardless of whether said master control unit is communicating with the respective camera.

* * * * *